(No Model.)

F. D. PETTEY.
FISH HOOK.

No. 543,268.          Patented July 23, 1895.

WITNESSES:
John A. Rennie
Theo. G. Hoster

INVENTOR
F. D. Pettey
BY
Munn & Co
ATTORNEYS.

United States Patent Office.

FRANK D. PETTEY, OF HAMPSHIRE, ILLINOIS.

FISH-HOOK.

SPECIFICATION forming part of Letters Patent No. 543,268, dated July 23, 1895.

Application filed December 1, 1894. Serial No. 530,572. (No model.)

*To all whom it may concern:*

Be it known that I, FRANK D. PETTEY, of Hampshire, in the county of Kane and State of Illinois, have invented a new and Improved Fish-Hook, of which the following is a full, clear, and exact description.

The object of the invention is to provide a new and improved fish-hook which is simple and durable in construction, arranged to readily catch and securely hold a fish, and when the latter is finally landed can be easily manipulated to conveniently and readily release the fish.

The invention consists principally of a rod formed with a device for holding bait and self-opening hooks adapted to be closed and held concealed at their points by and within the said device.

The invention also consists in certain parts and details and combinations of the same, as will be hereinafter fully described, and then pointed out in the claims.

Reference is to be had to the accompanying drawings, forming a part of this specification, in which similar letters of reference indicate corresponding parts in both views.

Figure 1:
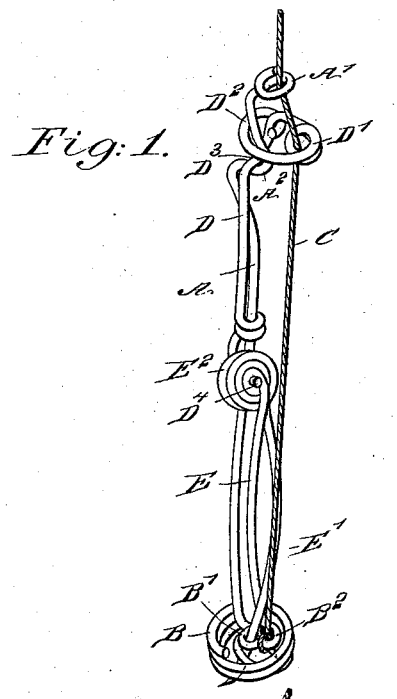
Figure 2:
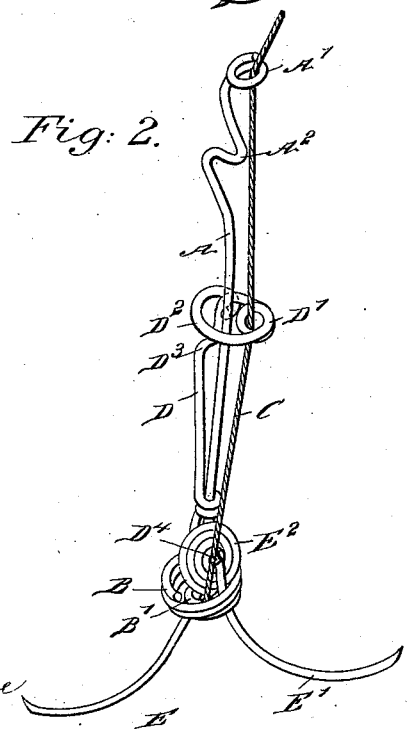

Figure 1 is a perspective view of the improvement in a closed position ready for use, and Fig. 2 is a perspective view of the same in an open position.

The improved fish-hook is provided with a rod A, preferably made of wire and formed at its lower end into a bait-holding device B by coiling the said wire into circular form, and pointed at the outer end, as plainly indicated in the drawings, or by forming said wire into a small hook at the end, to which bait not adapted to the use of the coiled arrangement can be attached. On this bait-holding device B is secured the lower end of the fish-line C, extending upwardly and passing through the eyes D' and A', of which the latter is formed on the upper end of the rod A, and the other eye D' is formed in a lip $D^2$ forming part of the upper end of an arm D fitted to slide on the rod A.

On the rod A, and near the upper end of the same, is arranged a catch $A^2$, adapted to fit under a bend $D^3$ forming part of the upper end of the arm D, so that when the said catch $A^2$ is under the said bend $D^3$ then the rod A and arm D are locked together, with the eyes A' and D' standing out of vertical alignment.

When the bait held on the device B is taken by a fish and a pull is exerted on the line C, then the said line tends to straighten, and in so doing pulls on the eye A', so as to draw the catch $A^2$ from underneath the bend $D^3$ to unlock the rod A and arm D and to permit the latter to slide downward on the rod A, as hereinafter more fully described.

On the lower end of the arm D is formed a transverse pin $D^4$, engaging and holding the center of a coiled spring $E^2$, having its ends formed into the shanks E and E' of the hooks proper, the said shanks E and E' being curved in opposite directions, as plainly shown in Fig. 2. The shanks E and E' are formed at their lower extreme ends with points, which readily engage the flesh of a fish, and the said shanks are guided in eyes B' and $B^2$ respectively, formed alongside each other within the bait-holding device B, as plainly shown in Fig. 1. When the device is in the position shown in Fig. 1—that is, when the arm D is locked to the rod A by the catch $A^2$ engaging the bend $D^3$, as previously described—then the lower ends of the hooks E and E' are drawn close to the bait-holding device B, so that the points of the hooks are covered or concealed by the bait and the device B. At the same time the shanks E and E' of the hooks are in a closed position ready to be forced outward apart, one from the other, whenever the arm D is unlocked from the rod A.

Now, when the device is in the position shown in Fig. 1 and bait is applied on the device B then the hook is ready to be cast overboard for catching a fish. As soon as the fish takes the bait then the line C straightens by the sudden pull, and consequently the arm D is released, as previously described, so that the force of the coiled spring $E^2$ on the bent shanks E and E' of the hooks causes the latter to slide in the eyes B' and $B^2$, whereby the arm D is moved in a downward direction on the rod A and the said shanks E and E' open inside of the fish to securely catch and hold the same. The fish is thus caught and securely held until landed, and when landed the operator simply slides the arm D on the rod A, so as to close the shanks E and E' of the hooks as the latter pass up through the eyes B' and B². By this operation the hooks are easily withdrawn from the fish and the entire fish-hook can be readily removed from the fish, so as to release the latter.

Having thus described my invention, I claim as new and desire to secure by Letters Patent—

1. A fish-hook, comprising a rod formed with a device for holding bait, self-opening hooks adapted to be closed and held concealed at their points by and within the said device, and a device for locking the hooks in their closed position, said locking device being adapted to be released by tension of the line substantially as shown and described.

2. A fish-hook, comprising a rod formed with a device for holding bait, self-opening hooks adapted to be closed and concealed at their points by and within the said device, a slide arm for carrying the said device, means substantially as described, for locking the arm to the rod while the device is used, and a fish line connected with the said device and passing through eyes on the said rod and slide arm, substantially as shown and described.

3. In a fish-hook, the combination of two elastic hooks adapted when released, to spring in opposite directions, a ring adapted to receive said hooks, and a locking device for locking said hooks to said ring, said locking device being adapted to be released by tension on the line, substantially as set forth.

FRANK D. PETTEY.

Witnesses:
J. L. KELLEY,
J. L. COLSON.